United States Patent Office 3,358,573
Patented Dec. 19, 1967

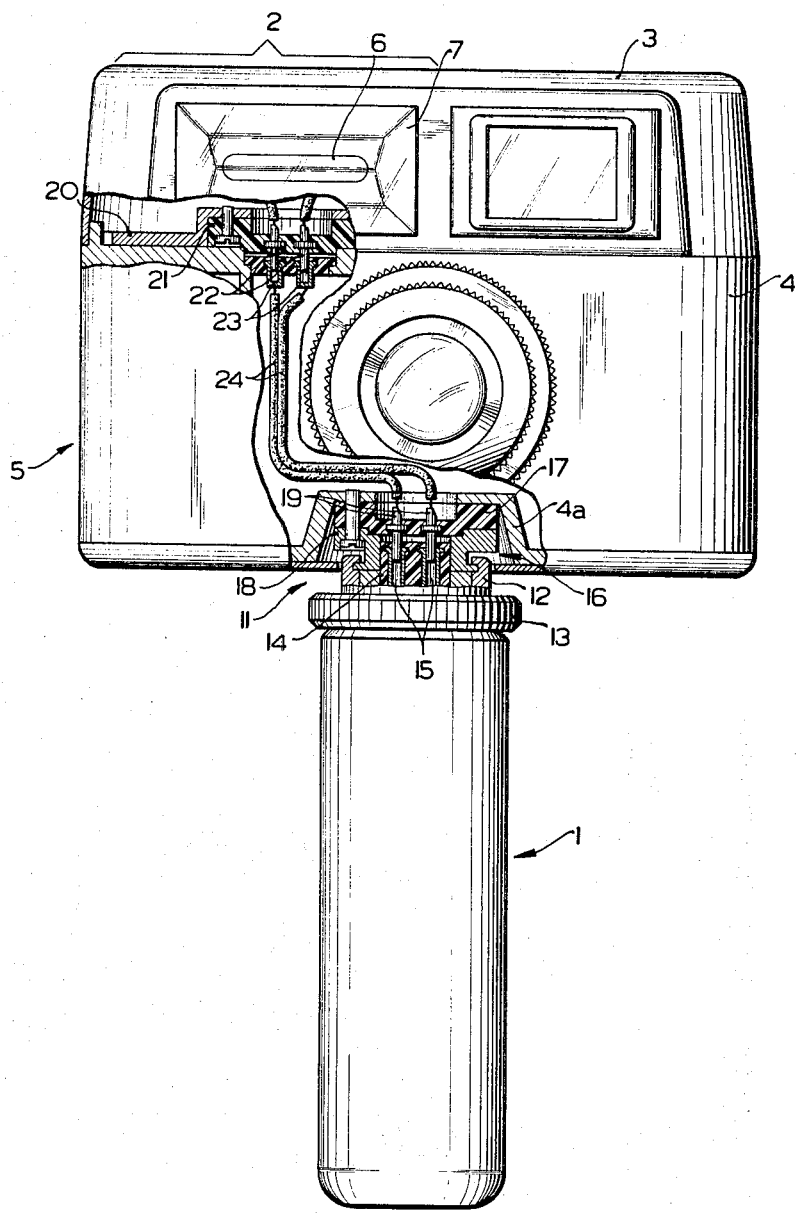

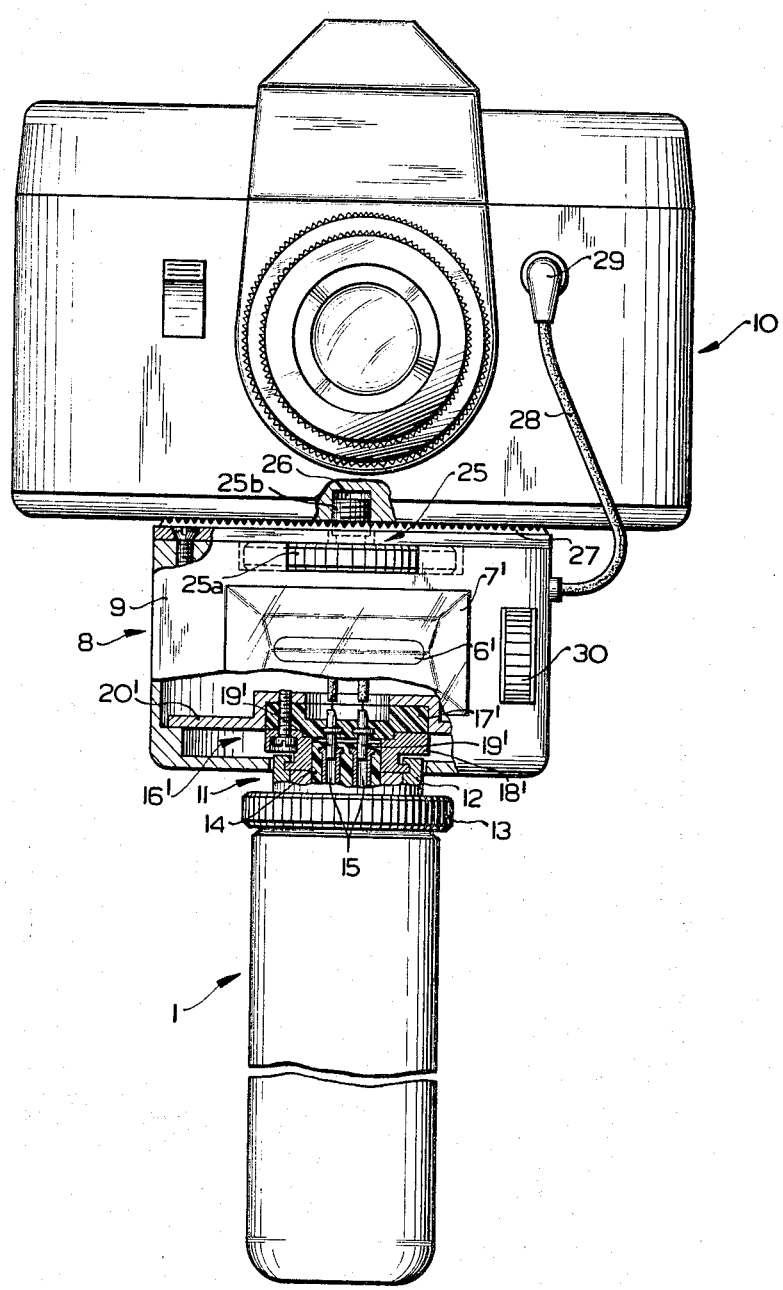

3,358,573
ELECTRONIC FLASH ASSEMBLIES FOR
PHOTOGRAPHIC PURPOSES
Oskar Bihlmaier, Braunschweig, Germany, assignor to Voigtlander, A.G., Braunschweig, Germany, a corporation of Germany
Filed May 17, 1965, Ser. No. 456,667
Claims priority, application Germany, June 12, 1964, V 26,153
10 Claims. (Cl. 95—11)

ABSTRACT OF THE DISCLOSURE

Electronic flash devices for photographic purposes, and in particular to be used in connection with cameras so as to provide flash exposures. There are three basic assemblies which coact together, these assemblies including a camera which has a built-in unit provided only with a plurality of components constituting part of an electronic flash device, the second of the basic assemblies being a first housing which can be detachably connected to the above camera and which carries the remainder of the components to constitute with the above part of an electronic flash device a first complete electronic flash when the housing of the second basic assembly is connected to the camera, and the third basic assembly being a second housing carrying only a plurality of components corresponding to those which are built into the above camera and this second housing is capable of being detachably connected with the first housing to form therewith an independent second complete electronic flash device. Thus, when the first housing is not used with the camera it can be used with the second housing to form therewith a separate independent electronic flash device.

---

The present invention relates to the art of photography.

More particularly, the present invention relates to electronic flash devices which are to be used for photographic purposes.

It is already known to provide a camera with a built-in unit which includes part of the components of an electronic flash device. These components carried by the built-in unit of the camera will conventionally include at least the flash tube and reflector of the electronic flash device. The remainder of the components of the electronic flash device, including at least the source of current thereof, is conventionally carried by a separate housing capable of being detachably connected with the camera so as to cooperate with the components of the built-in unit to form a complete electronic flash device. This separate housing preferably takes the form of a hand-grip, so that when the separate housing of the electronic flash device is attached to the camera it will serve as a grip therefor.

An electronic flash device of this latter type is only complete and capable of being used when this separate housing is coupled to the camera. Of course, the camera can be used for making exposures without flash illumination, such as daylight exposures, and under these latter conditions the separate housing with the components of the flash device carried thereby are not used. Therefore, under these conditions, this separate housing and the components carried thereby form a useless accessory.

It is a primary object of the present invention to render this latter part of the electronic flash device useful.

In particular, it is an object of the present invention to provide a structure which enables the detachable portion of an electronic flash device to be of utility with a camera which has no built-in flash structure.

Furthermore, it is an object of the present invention to provide an assembly in which, as much as possible, duplicate components are identically constructed so that advantage is taken of mass-production techniques to reduce the costs.

Also, it is an object of the present invention to provide a structure which makes use of conventional structures already available on conventional cameras for the purposes of the present invention.

Also, the objects of the present invention include the provision of a complete electronic flash device capable of being effectively attached to a conventional camera which has no built-in flash structure.

The invention is illustrated by way of example in the accompanying drawings which form part of the application and in which:

FIG. 1 is a partly sectional elevation showing an electronic flash device according to the present invention which includes a built-in unit of a camera which carries part of the components of the flash device and a separate housing carrying the remainder of the components of the flash device; and FIG. 2 is a partly sectional elevation illustrating an electronic flash device which is completely separate, in its entirety, from a camera and which can be detachably connected with a conventional camera, as indicated in FIG. 2.

The electronic flash structure of the present invention illustrated in the drawings, is made up of three main assemblies. The first main assembly includes a separate housing 1 which preferably takes the form of a hand-grip and which carries in its interior a first group of components which form part of, but not all of, an electronic flash device. Among the group of components carried by the separate housing 1 is at least the source of current which as a rule takes the form of a battery.

The second main assembly of the electronic flash structure of the present invention includes a second group of components which form the built-in unit 2 indicated in FIG. 1 as housed within the cap or enclosure 3 which is mounted on top of the camera housing 4 of a camera 5, in a conventional well known manner. Among the components of the built-in unit 2 of the camera 5 is at least the electronic flash tube 6, as shown in dotted lines in FIG. 1, and the reflector 7 situated behind the flash tube 6.

The components carried by the separate housing 1 form together with the components of the built-in unit 2 a complete electronic flash device.

The third main assembly of the present invention is illustrated in FIG. 2 and is in the form of an accessory 8 which includes a second separate housing 9 which houses a third group of components which correspond to and are in fact identical with the group of components of the built-in unit 2. Thus, the second separate housing 9 is provided with a reflector 7' in front of which is situated an electronic flash tube 6'. Thus, the first separated housing 1 and the second separate housing 9, when attached to each other in a manner described below, are capable of forming, from the components carried by these housings, a complete electronic flash device which is separate from any camera and which may be used with a conventional camera such as the camera 10 which has no built-in flash structure and which is indicated in FIG. 2.

The separate housing 1, which has the configuration of a hand-grip, is provided at its upper end with an electrical and mechanical coupling means 11. The mechanical portion of the coupling means 11 includes a part of a bayonet connecting assembly 12, this part 12 of the bayonet connection being turnable with a rotary ring 13 carried by the upper part of the housing 1 and capable of being manually turned by the operator. The bayonet structure 12 surrounds the electrical part of the coupling means 11, this electrical part being formed by a plug assembly 14 which is provided with prong receptacles 15.

The mechanical and electrical coupling means 11 is adapted to be connected with the complementary coupling means 16 carried by the camera housing 4 at the bottom portion 4a thereof. This complementary mechanical and electrical coupling means 16 includes a support 17 fixedly carried by the camera housing 4 and fixedly carrying the stationary part 18 of the bayonet connection 12, 18, so that the bayonet structure 12 can be slipped into and turned with respect to the structure 18 to effect the bayonet connection of the separate housing 1 to the camera 4 of FIG. 1. The electrical part of the coupling means 16 includes the prongs 19 which are respectively received in the plug receptacles 15. The support 17 is mounted within an inwardly directed hollow portion 4a of the bottom wall of the camera housing 4, so that in this way the coupling structure 16 is situated within a recess at the exterior of the housing 4 of the camera 5 and thus does not project therefrom.

The built-in unit 2 includes a support means 20 which carries the various components of the built-in unit and which is in the form of a plate capable of being mounted on the top wall of the camera housing 4 in the interior of the enclosure 3 which is carried by the top wall of the housing 4 in a conventional well known manner. This carrier or support means 20 is provided with a holder 21 for a pair of electrically-conductive prongs 22 which are received in plug receptacles 23, respectively, when the support means 20 is mounted on the camera housing 4 in the position indicated in FIG. 1. The pair of prong-receptacles 23 are electrically connected with the prongs 19, respectively, by way of a pair of electrical conductors 24 which extend along the interior of the housing 4 in the manner indicated in FIG. 1.

The second separate housing 9, shown in FIG. 2, includes a support means 20′ which corresponds to and is in fact identical with the support means 20 of the unit 2. This support means 20′ carries components of the electronic flash device which are identical with and arranged in the same way as those carried by the support means 20 of the built-in unit 2. Thus, it will be seen that the support means 20′ carries a holder 17′, corresponding to the part 17 of the coupling means 16 and carrying, in the same way, a pair of prongs 19′ identical with the prongs 19, and in addition the support structure 17′ is fixed with the bayonet connecting structure 18′ which is constructed in the same way as and corresponds to the bayonet-connecting structure 18 of FIG. 1. Therefore, the pair of support means 20 and 20′ are not only identical and correspond to each other, but in addition they carry the same components of the electronic flash device with these components arranged in the same way both in the case of the camera of FIG. 1 and in the case of the separate housing 9. In other words, the construction of the support means 20 is such that this support means can carry the mechanical and electrical coupling means 16, and in the case of the separate housing 9 the support means 20′ does in fact carry a structure which corresponds to the coupling means 16, so that in this way the coupling means 11 of the separate housing 1 can be connected either with the coupling means 16 carried by the camera 4 or with the corresponding coupling means 16′ carried by the support 20′ of the separate housing 9. As a result of this feature, the number of different components required to be manufactured is reduced to a minimum, and thus advantage is taken of mass-production techniques to keep the costs extremely low.

The second separate housing 9 carries a means for detachably connecting this second housing 9 to a conventional camera 10 which does not have any built-in flash structure, so that with the first housing 1 connected with the second housing 9, the components of both of these housings will together form a complete electronic flash device capable of being used with a conventional camera 10. The means for connecting the second housing 9 to the camera 10, shown in FIG. 2, preferably includes a tripod screw 25 carried by the second housing 9 for rotary movement but prevented from axial movement. This rotary screw 25 has an annular, manually-engageable head portion 25a which extends laterally beyond the housing 9 at its upper portion so as to be accessible to the operator who by engaging the head 25a, which may have a knurled periphery, can turn the screw 25. This screw 25 is provided with a threaded shank portion 25b which extends through a suitable opening upwardly beyond the housing 9, and this threaded shank portion can be received in the threaded bore 26 conventionally provided at the bottom of the camera 10 for mounting the latter on a conventional tripod. The housing 9 is provided at its upper surface which engages the lower surface of the housing of the camera 10 with a layer 27 of the material having a high coefficient of friction so that the possibility of any relative movement between the housing 9 and the camera 10 after the housing 9 is attached thereto by the screw 25 is reduced to a minimum.

Moreover, the second housing 9 carries an electrical cable 28 which can be releasably connected with the flash-synchronizing contact 29 conventionally carried by the camera 10. Finally, the separate housing 9 carries a switch 30 capable of turning on and off the entire electronic flash device formed by the components of both housings 1 and 9.

As may be seen from FIG. 1, by attaching the separate housing 1, by way of the pair of mechanical and electrical coupling means 11 and 16 to the camera 5, a complete electronic flash device is provided for the camera 5, the components of the flash device which are carried by the separate housing 1 being electrically connected by the plug and socket connection 15, 19 and the conductors 24 to the plug and socket connection 22, 23 which serves to electrically connect the components of the housing 1 with the components of the built-in unit 2 mounted within the cap 3 situated on top of the camera housing 4.

The camera 5 can, however, be used completely independently of the separate housing 1 for making exposures without flash illumination, and in this case the separate housing 1, which is of course now detached from the camera 5, can be connected with the second housing 9 so that the components carried by the housing 1 will form with the components carried by the housing 9 a complete electronic flash device. This latter electronic flash device has the components of the pair of housings operatively connected to each other through the mechanical and electrical coupling means 11, 16′ which is of course identical with that used for connecting the housing 1 to the camera 5. This complete electronic flash device, shown in FIG. 2, can be attached to the conventional camera 10 in the manner described above. It is preferred to provide the built-in unit 2 with components which include, in addition to the flash tube 6 and the reflector 7, an ignition device, a direct current converter, and an automatic control device for maintaining the charging voltage of a storage capacitor constant. On the other hand, in the separate housing 1 the components include, in addition to the source of current, a storage capacitor. This division of the components of the electronic flash device between the built-in unit and the housing 1 is, however, not essential and may be varied according to the available space.

The invention is of course not limited to the specific example shown in the drawing and described above. In particular, the coupling structure for coupling the housing 1 either to the camera 5 or to the second housing 9 can take other forms. Moreover, instead of providing a tripod screw 25 for connecting the second housing 9 to the conventional camera, it is possible to use a foot-and-shoe type of connection where the detachable housing carries a foot received in a shoe conventionally carried by the camera 10. Also, it is of course possible to give to the separate housing 1 a relatively flat configuration where it will conform to the bottom of the camera 5 instead of taking the form of a handgrip, and of course in this case the camera would be held by the operator in the conventional manner.

All of the above-described details shown in the drawing and referred to above, can be combined together in any desired manner.

What is claimed is:

1. For use in photography, a camera having a built-in unit provided only with a plurality of components constituting part of an electronic flash device, a first housing being detachably connected to said camera and carrying the remainder of the components of the electronic flash device, said first housing when attached to said camera providing an operative connection between the components of said built-in unit and the components carried by said first housing so as to provide a first complete electronic flash device, and a second housing carrying only a plurality of components corresponding to those of said built-in unit and capable of being detachably connected with said first housing to form therewith a second complete electronic flash device when said first housing is not connected to said camera.

2. The combination of claim 1 and wherein said second housing carries a means for connecting the latter to a conventional daylight exposure camera, said camera when used alone capable only of making daylight exposures, so that said second housing with said first housing connected thereto can form a complete electronic flash device for said conventional daylight exposure camera to which said second housing is attached, and said second housing carrying a further means which is adapted to be connected to a flash-synchronizing contact of said conventional daylight exposure camera.

3. The combination of claim 2 and wherein said daylight exposure camera is provided with a threaded bore for receiving a tripod screw, and said means for connecting said second housing to said conventional camera including a rotary tripod screw to be received in said threaded bore.

4. The combination of claim 3 and wherein said tripod screw is carried by said second housing for rotary movement but is prevented from axial movement, said tripod screw having a threaded shank portion extending beyond said second housing to be received in said threaded bore and said tripod screw also having a manually-engageable portion projecting beyond said second housing to be accessible to the operator for turning said tripod screw.

5. The combination of claim 1 and wherein said second housing carries a means for connecting said second housing to a conventional daylight exposure camera, said camera when used alone capable only of making daylight exposures, so that said second housing when connected with said first housing can be attached to the latter camera to provide a complete electronic flash device therefor, and said second housing having a surface of a high coefficient of friction which is situated directly next to and engages the conventional camera when said second housing is attached thereto.

6. The combination of claim 1 and wherein said second housing carries a means for connecting the latter to a conventional daylight exposure camera, said camera when used alone capable only of making daylight exposures, so that said second housing with said first housing connected thereto can form a complete electronic flash device for said conventional daylight exposure camera to which said second housing is attached, and said second housing carrying a cable which is adapted to be connected to a flash-synchronizing contact of said conventional daylight exposure camera.

7. The combination of claim 1 and wherein said complete electronic flash device formed by said first and second housings and the components carried thereby when said first and second housings are connected to each other includes a switch carried by one of said housings for turning the complete electronic flash device on and off.

8. The combination of claim 1 and wherein the built-in unit includes a support means and a plurality of electronic flash components carried thereby and said second housing carrying a support means substantially identical with that of said built-in unit, said support means carried by said second housing also carrying components identical with those of said built-in unit and arranged in the same way on the support means of said second housing as on the support means of said built-in unit, so that the assembly of the support means and said components carried thereby can be interchangeably placed either in the built-in unit of the camera or in the second housing.

9. The combination of claim 1 and wherein an electrical and mechanical coupling means releasably couples said first housing to said camera with said built-in unit, and a second mechanical and electrical coupling means identical with said first-mentioned coupling means for releasably coupling said first and second housings to each other.

10. The combination of claim 1 and wherein the built-in unit and said second housing both carry substantially identical support means which support substantially identical components arranged in substantially the same way, said camera with said built-in unit carrying a coupling means for releasably coupling said first housing thereto and said support means of said second housing carrying a coupling means identical with said coupling means of said camera with said built-in unit for detachably coupling said first housing to said second housing.

References Cited

UNITED STATES PATENTS

| 2,614,471 | 10/1952 | Markowitz | 95—86 |
| 2,844,081 | 7/1958 | Wagner et al. | 95—11.5 |
| 2,953,675 | 9/1960 | Kluge | 95—11.5 X |
| 3,001,461 | 9/1961 | Irwin | 240—1.3 |
| 3,134,547 | 5/1964 | Kapteyn et al. | 95—11.5 X |
| 3,187,341 | 6/1965 | Kubota et al. | 95—86 |

FOREIGN PATENTS 889,627  2/1962  Great Britain.

NORTON ANSHER, *Primary Examiner.*

FRED L. BRAUN, *Assistant Examiner.*